United States Patent Office 3,341,920
Patented Sept. 19, 1967

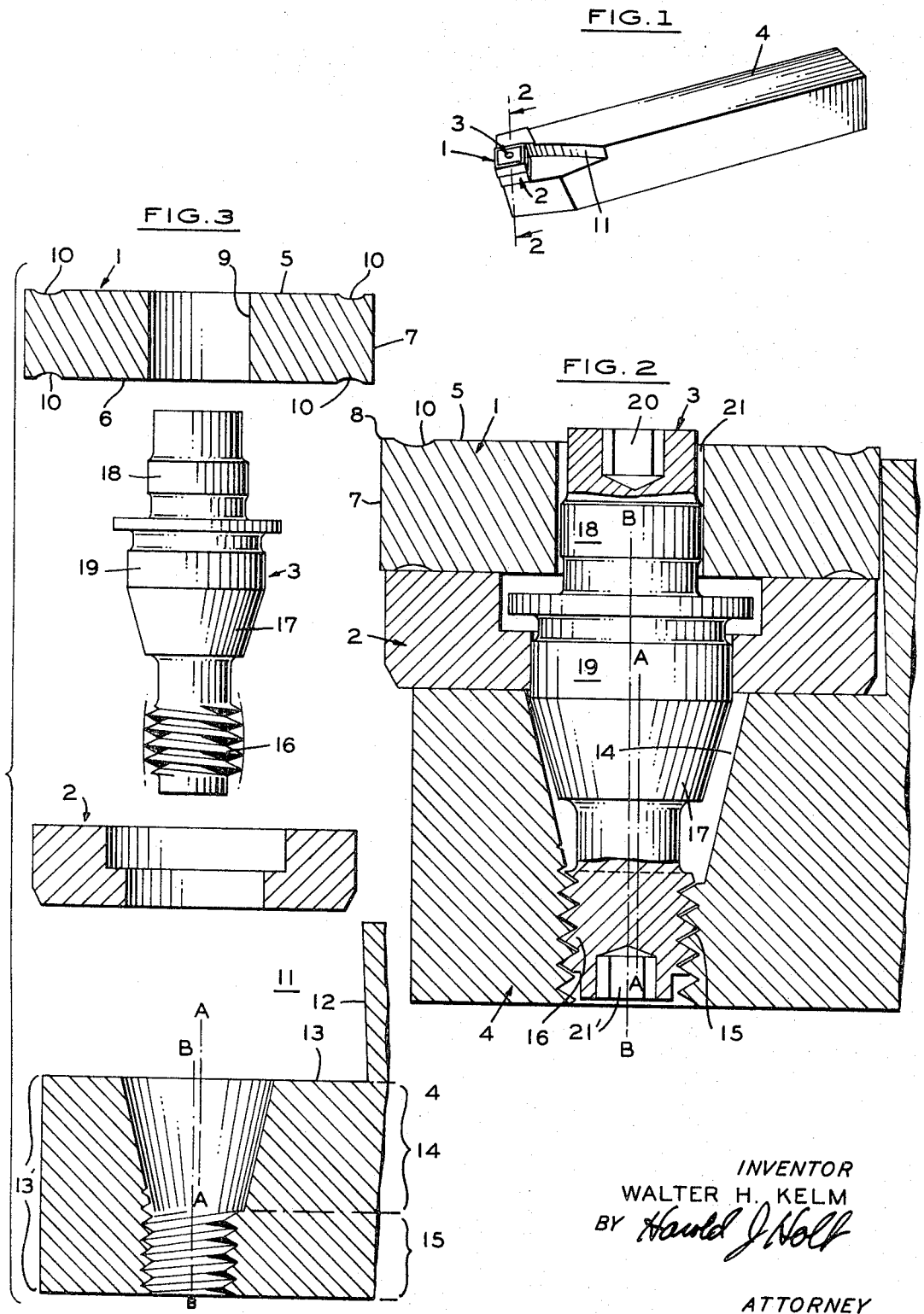

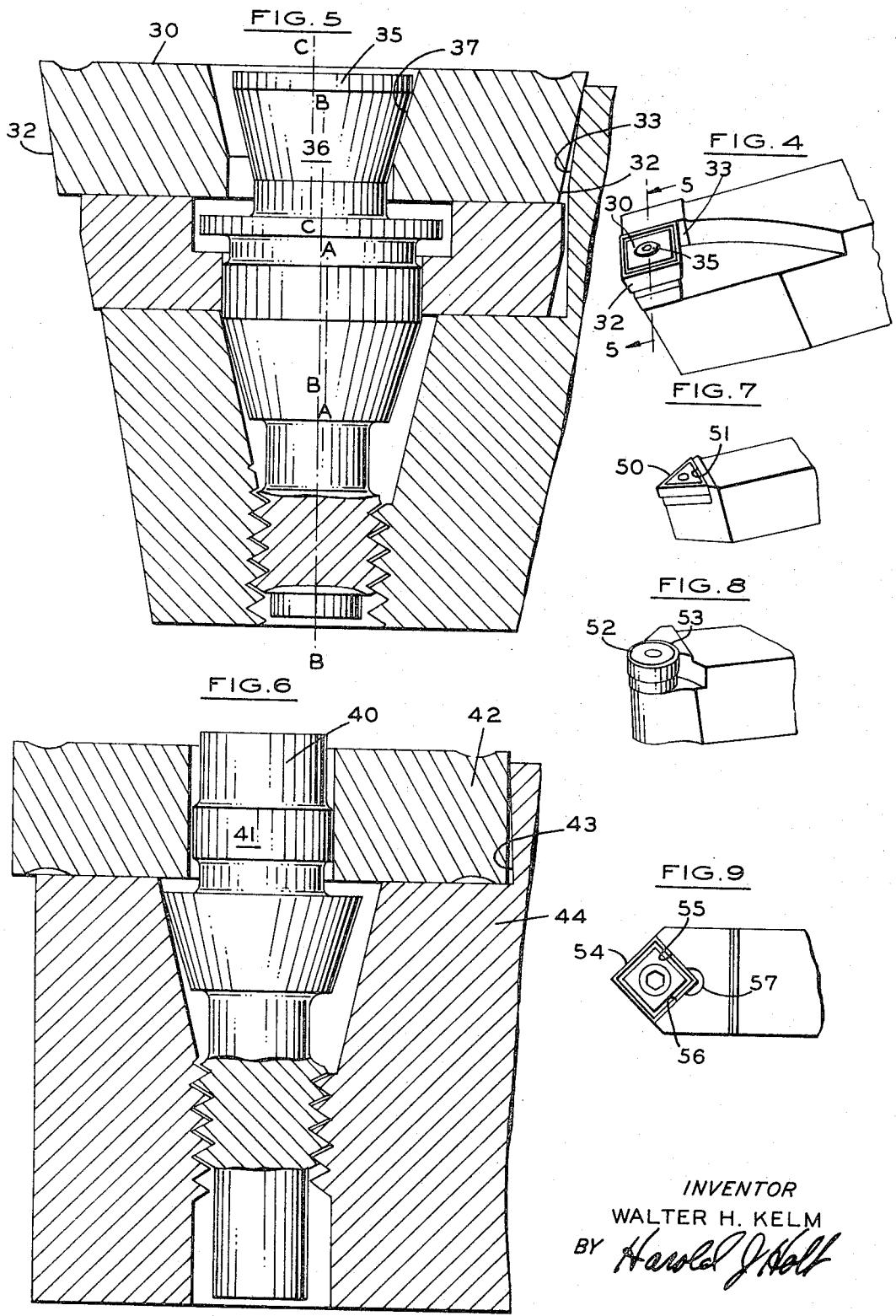

3,341,920
CUTTING TOOL
Walter H. Kelm, Mount Clemens, Mich., assignor to General Electric Company, a corporation of New York
Filed Feb. 16, 1965, Ser. No. 433,117
10 Claims. (Cl. 29—96)

ABSTRACT OF THE DISCLOSURE

A cutting tool in which a pin releasably holds an insert, or an insert and seat, in place in the recess of a cutter body. A portion of the hole in the cutter body in which the threaded end of the pin fits is offset from the remainder of the hole. This creates an interfering contact with the pin as it is threaded, thereby moving the pin laterally toward the shoulder to lock the insert against the shoulder.

---

This invention is directed to a cutting tool of the type used in the machining of metal and more specifically to a cutting tool in which a disposable insert of a hard cutting material is releasably held in a toolholder.

A principal object of the present invention is to provide a cutting tool for holding a disposable cutting insert which cutting tool has a minimum number of component parts but which firmly and positively retains an indexible and invertible insert during a machining operation.

It is an additional object of this invention to provide a cutting tool in which a hard cutting insert is releasably held in the shank of a cutting tool holder by a pin-type holding mechanism which permits indexing, inverting or removing of the cutting insert to be accomplished simply and rapidly. It is still an additional object of this invention to provide a cutting tool holding mechanism which may be used for holding positive as well as negative rake cutting inserts without the necessity of overhead or bridge-type clamps.

In general, the objects of the present invention are achieved in a cutting tool having just three, or in some instances four, components—a shank, a retention pin, an insert and, if necessary, a seat for the insert. The shank contains a recess to provide a base and a supporting shoulder for the insert or for the insert and seat. The retention pin may be adjustably secured at one end thereof in a hole in the recess of the shank. The other end of the pin projects into a hole in the insert. The hole in the shank contains a portion which is asymmetrically displaced or offset with respect to the axis of the remainder of the hole. The design of the retention pin and the hole in the shank in which it is secured is such that the pin, when moved axially into the hole in the shank, forces the insert against the supporting shoulder of the shank and locks it in operating position.

The invention will be more clearly understood from the following description taken in conjunction with the accompanying drawing in which:

FIG. 1 is a perspective view of a cutting tool of the invention;

FIG. 2 is an enlarged cross-sectional view taken along the lines 2—2 of FIG. 1;

FIG. 3 is an exploded view of the head portion of the cutting tool shown in FIGS. 1 and 2;

FIG. 4 is a perspective view of the head portion of a cutting tool of the invention utilizing a positive rake cutting insert;

FIG. 5 is an enlarged cross-sectional view taken along the lines 5—5 of FIG. 4;

FIG. 6 is a cross-sectional view of a cutting tool of the invention which does not have a seat for the cutting insert; and FIGS. 7 and 8 are perspective views and 9 is a plan view illustrating three additional embodiments of cutting tools of the invention.

Referring to FIGS. 1, 2 and 3, it can be seen that the cutting tool comprises four principal parts—a cutting insert 1, a cutting insert seat 2, a retention pin 3, and a cutting tool shank 4. The cutting insert is of the disposable or throwaway type having opposite spaced parallel faces 5 and 6 and peripheral surfaces 7. A plurality of cutting edges 8 are provided on each face of the insert. The insert shown in FIGS. 1–3 is of the so-called negative rake type in which the peripheral surface 7 is perpendicular to parallel faces 5 and 6. Central hole 9 is perpendicular to each of the parallel faces. Each of the faces of the insert contains continuous chip-control grooves 10. The cutting tool shank 4 contains a recess 11 at the head portion thereof to provide a supporting shoulder 12 and a base 13 for supporting insert 1 and seat 2. The shank has a hole 13' therethrough, the upper portion 14 of which opens into the base of the recess, the lower portion 15 of which is threaded and opens to the exterior surface of the shank. The terms "upper" and "lower" are used herein with reference to the normal position of the cutting tool as shown in the drawings. The term "axial" as used herein means along the axis of hole 9 in the insert and hole 13' in the shank. The tools may of course assume any position in a cutting or machining operation.

As can be seen in FIGS. 2 and 3, the upper portion 14 of the hole in the shank, that is, the portion adjacent the base of the recess, is tapered inwardly from the base of the recess to form a conical portion having a central axis identified by the line A—A. The remaining threaded portion of the hole in the recess of the shank is cylindrical and has a central axis B—B offset from axis A—A of the conical portion of the hole. The axis A—A is offset from the axis B—B in a direction toward the supporting shoulder 12 of the recess in the shank. The result is that the portion of the hole adjacent the base of the recess is offset from the remainder of the hole in a direction toward the shoulder of the recess.

Retention or locking pin 3 has a threaded portion 16 at one end thereof, an enlarged central conical portion 17 and a projecting essentially cylindrical portion 18 at the other end thereof. Retention pin 3, unlike the hole 13' in the shank, is symmetrical about a single axis. The pin is adjustably secured at the threaded end thereof by engagement with the mating threads in the hole in the recess of the shank. For reasons which will be brought out more clearly hereinafter, the threaded engagement of the pin and the hole in the shank is a relatively loose one. The central conical portion 17 of the pin forms a wedging or interfering contact with the conical portion of the hole in the shank. The cylindrical projecting portion 18 of the pin 3 projects into the central hole in the insert. The retention pin also contains an enlarged cylindrical portion 19 of approximately the same diameter as the largest diameter of conical portion 17. This enlarged cylindrical portion 19 fits within the central hole in the seat 2 and acts essentially to position and locate the seat.

Tightening and loosening of a cutting insert in the cutting tool for purposes of indexing, inverting or changing the insert are as follows. As the pin is threaded into the shank by a suitable drive, such as a hexagonal wrench or key in the hexagonal socket 20 or 20' at the top or bottom of the pin, contact is made between the central tapered portion 17 of the pin and the corresponding tapered portion 14 of the hole in the shank (see FIG. 2). As further threading proceeds, the pin is forced laterally in a direction toward the shoulder 12 of the recess from axis B—B toward axis A—A. The pin acts much in the manner of a lever with its fulcrum at the lower or threaded portion thereof. It will be apparent that the upper cylindrical projection 18 of the pin is displaced laterally toward the locking shoulder 12 a correspondingly greater distance than the central conical portion because of leverage principles. As the projection 18 moves toward the shoulder, the insert is locked securely in place. Some downward persuasion of the tip also occurs because the projecting portion 18 of the pin moves in an approximate arcuate path—i.e., both axially and laterally—as it is tightened. As a practical matter, the offset of central axes A—A from B—B need only be a matter of a few thousandths of an inch. The offset has been exaggerated in FIGS. 2 and 3 for purposes of illustration. This very small offset has been found to be sufficient to firmly lock the insert against the shoulder with less than a full rotation of pin 3.

It should be noted, as shown particularly in FIG. 3 of the drawing, that the threads at the lower portion of the pin form a barrel-shaped or convex contour at their outer diameters. The convexity of the surface of the threads of the pin is exaggerated in FIG. 3 for purposes of illustration. The difference in diameter of the widest and narrowest portion of the threads need be only (as in the case of the offset in the hole of the shank) a few thousandths of an inch. In addition, the pin contains only a small number of threads so that there is limited threaded engagement between pin and shank. Moreover, the clearance between the pitch diameter of the threads in the pin and the corresponding diameter of the threads in the hole of the shank provides a relatively loose threaded engagement. These three features—convexity of the threads, their limited and loose engagement—enable the pin to swivel as it is tightened (or loosened), moving laterally toward the locking shoulder at the same time that it is moving axially as it is being threaded.

As will be noted in FIG. 2, the angle of taper of the pin 3 is slightly greater than the corresponding angle of taper of the hole 14. The function of this relationship between the angle of the pin and angle of the hole in the shank is (1) to provide contact between pin and shank as close as possible to the insert, i.e., at the uppermost part of the conical portion of the pin, in order to provide the strongest possible support for projection 18 which holds the insert against the shoulder, and (2) to provide relatively limited contact area between pin and shank to facilitate more accurate determination of the various dimensions necessary in pin and shank to obtain secure holding of the insert. As can also be seen in FIG. 2, the angle of the locking shoulder 12 to the base 13 of the recess is slightly less than 90° to assure firm insert support at the cutting edge. In practice, the included angle between the shoulder and the base ranges from about 88°–90°. It should also be noted that the uppermost portion of the cylindrical projection 18 of pin 3 is of slightly reduced diameter to provide a clearance at 21 of, for example, several thousandths of an inch. Because of this, projection 18 contacts an axially lower portion of the insert than is contacted by the locking shoulder. Thus, when the insert is locked in position a torque on the insert is produced which forces the nose and exposed cutting edge of the insert down and back, thus firmly locking the insert in cutting position against the stresses of a machining operation.

An important advantage of the present invention resides in the ability of the locking pin of the invention to hold cutting inserts for both positive and negative rake cutting. The inserts illustrated in FIGS. 1 thru 3 of the drawings are what are commonly termed "negative rake" cutting inserts, i.e., inserts in which the peripheral surfaces 7 are perpendicular to the parallel faces 5 and 6. For positive rake cutting, a positive rake insert of the type illustrated in FIGS. 4 and 5 must be used. In this type of insert, the peripheral surface of the insert is not perpendicular to the parallel faces of the insert. As shown in FIG. 5, the upper parallel face 30 of the insert 31 forms an acute angle with the peripheral surface 32 of the insert, thus presenting a positive rake angle to the work surface. The shoulder 33 is substantially parallel to the surface 32, although as in the case with negative rake inserts (FIGS. 1–3), the angle of taper of the shoulder is preferably slightly less than that of the insert surface 32. It is much more difficult to hold such positive rake inserts by known pin-type holding means in view of the tendency of such inserts to climb up the locking shoulder of the shank because of the angled or tapered contact (FIG. 5) between insert and shoulder.

The pin-type holding means of the present invention may be used to firmly hold a positive rake insert in a cutting tool as illustrated in FIGS. 4 and 5. As there shown, insert 31 and seat 34 are held by pin 35 in the same fashion as illustrated in connection with the embodiment of FIGS. 1 thru 3 and the features of the pin and the hole in the shank and their engagement with each other are essentially as there described. However, as can be seen in FIG. 5, the top projecting portion of the pin 35 contains a tapered portion 36 which contacts a complementary taper or countersink 37 in the central hole of the insert. The angle of taper of the hole in the insert should be approximately equal to, or slightly greater than, the included angle formed by the upper parallel face 30 and peripheral surface 32 of the insert. Again, as in FIGS. 1 thru 3, shoulder 33 is a degree or two less than parallel with the peripheral surface 32 of the positive insert.

It will be noted (FIG. 5) that axis A—A of the conical portion of the hole in the shank is displaced laterally toward the shoulder with respect to axis B—B of the remainder or threaded portion of the hole in the shank. This displacement is the same as that illustrated in the embodiment of FIGS. 1 thru 3. However, in positive rake cutting tools of the type shown in FIG. 5 it is preferable, to insure firm locking of the pin against the insert, that the center line or axis C—C of insert 31 be displaced laterally away from shoulder 33 when the insert is in locked position. This feature, while particularly useful with positive rake tools, may also be used with negative rake cutting tools where, for example, the inserts are of very small size. In general, in the cutting tools of the invention the axis of the hole in the insert (C—C in FIG. 5) should either coincide with the axis of the threaded portion of the hole in the shank or be offset laterally away from the shoulder with respect to the axis of the threaded portion of the hole.

FIG. 6 illustrates a further embodiment in which no seat for the cutting insert is used. Other than the omission of the seat and that portion of the pin utilized to hold the seat in position on the shank of the cutting tool, the design and operation of the tool are the same as that shown in FIGS. 1 thru 3. The pin 40 contains projection 41 which, in locking position, forces the insert 42 against the shoulder 43 in the shank 44. The center line or axis of the conical portion of the hole 45 in the shank is offset or displaced toward the shoulder 43 with respect to the center line of the remaining threaded portion of the hole in the shank as in the case of the embodiments shown in FIGS. 2 and 5.

FIGS. 7, 8 and 9 illustrate additional embodiments of the invention for holding triangular, round and square inserts respectively. In FIG. 7, triangular insert 50 is held against shoulder 51. In FIG. 8, round insert 52 is held against a correspondingly curved shoulder 53. The displacement of the center line in the hole of the shank is in the direction of a line bisecting shoulder 53. In FIG. 9, square insert 54 is held in the pocket formed by two shoulders 55 and 56. In order to insure a close tolerance fit of the insert against both shoulders, the shoulders are relieved at 57. Displacement of the center line of the hole in the shank in this embodiment is in a direction toward a line where the two shoulders theoretically meet.

What I claim as new and desire to secure by Letters Patent of the United States is:

1. In a cutting tool,
a disposable cutting insert having an axial hole therein,
a cutter body having a recess therein to provide a base and at least one supporting shoulder for the insert, the cutter body having a hole therein extending generally transverse to the base of the recess and adapted for alignment with the axial hole in the insert, the axis of the portion of said hole adjacent the base of the recess being offset from the axis of the remainder of the hole in a direction toward the shoulder of the recess.
a retention pin fitting within the hole in the cutter body with an end thereof projecting into the hole in the insert, said pin forming an interfering contact with the offset portion of the hole in the cutter body, the insert being releasably held in the recess of the cutter body by movement of the retention pin toward the shoulder.

2. In a cutting tool,
a disposable cutting insert having an axial hole therein,
a shank having a recess therein to provide a base and at least one supporting shoulder for the insert, the shank having a hole therein extending axially from the base of the recess and adapted for alignment with the axial hole in the insert, a portion of the hole in the shank being asymmetrically displaced with respect to the axis of the remainder of the hole,
an axially symmetrical retention pin fitting within the hole in the shank, with an end thereof projecting into the hole in the insert, said pin forming an interfering contact with the asymmetrically displaced portion of the hole in the shank, whereby axial movement of the pin into the shank forces the projecting portion of the pin laterally toward the shoulder, thus locking the insert in place.

3. In a cutting tool,
a disposable cutting insert having an axial hole therein,
a shank having a recess therein to provide a base and at least one supporting shoulder for the insert, the shank having a hole therein extending axially from the base of the recess and adapted for alignment with the hole in the insert, the portion of the hole adjacent the base of the recess tapering inwardly from said base and having an axis offset from the axis of the remainder of the hole in a direction toward the shoulder of the recess,
a retention pin adjustably secured at one end thereof in the hole in the recess, the central portion of the pin forming a wedging contact with the tapered portion of the hole in the shank, the other end of the pin projecting into the hole in the insert, the insert being releasably held in the recess of the shank by movement of the retention pin into the hole in the shank.

4. In a cutting tool,
a disposable cutting insert having an axial hole therein,
a shank having a recess therein to provide a base and at least one supporting shoulder for the insert, the shank having an axial hole therein extending from the base of the recess into the shank and adapted for alignment with the central hole in the insert, the portion of the hole adjacent the base of the recess tapering inwardly from said base and having an axis offset from the axis of the remainder of the hole in a direction toward the shoulder of the recess,
a retention pin having an enlarged central portion tapered to form wedging contact with the tapered portion of the hole in the recess, the taper of the central portion of said pin being slightly greater than the taper of the tapered portion of the hole in the shank, the other end of said pin projecting into the hole in the insert, the insert being releasably held in the recess of the shank by movement of the retention pin into the hole in the shank.

5. In a cutting tool,
a disposable cutting insert having an axial hole therein,
a shank having a recess therein to provide a base and at least one supporting shoulder for the insert, the shank having an axial hole therein opening into the base of the recess and adapted for alignment with the axial hole in the insert, said hole having a first conical portion adjacent the base of the recess tapering inwardly from said base toward a second cylindrical threaded portion, the axis of the conical portion being offset from the axis of the cylindrical portion in a direction toward the shoulder of the recess,
a retention pin having a threaded portion at one end thereof for loose threadable engagement with the threaded portion of the hole in the recess, and an enlarged central portion tapered to form wedging contact with the conical portion of the hole in the recess, the other end of said pin projecting into the hole in the insert, the insert being releasably held in the recess of the shank by tightening of the retention pin.

6. The cutting tool of claim 5 in which the outer contour of the threaded portion of the retention pin is convex.

7. In a cutting tool,
a disposable cutting insert having opposite parallel faces, peripheral surfaces perpendicular to said faces, and a central axial hole therein between said faces,
a shank having a recess therein to provide a base and at least one shoulder for support of a face and at least one peripheral surface respectively of the insert, said shoulder upstanding from said base, the shank having an axial hole opening into the base of the recess, and adapted for alignment with the axial hole in the insert, the portion of the hole opening into the base of the recess being tapered inwardly from said base, said tapered portion of the hole having an axis offset from the axis of the remainder of the hole in a direction toward the shoulder of the recess,
a retention pin adjustably secured at one end thereof in the hole in the recess, having an enlarged central portion adapted to form wedging contact with the tapered portion of the hole in the shank, the other end of said pin projecting into the hole in the insert, the insert being releasably held in the recess of the shank by tightening of the retention pin.

8. In a cutting tool,
a disposable cutting insert having upper and lower parallel faces, peripheral surfaces between said faces forming an acute angle with said upper face, and a central axial hole therein between said parallel faces, said axial hole being tapered inwardly from said upper face,
a shank having a recess therein to provide a base and shoulder for support of the lower face and a peripheral surface respectively of the insert, said shoulder being tapered so that it is substantially parallel to the peripheral surface of the insert, said shank having a hole opening into the base of the recess and adapted for alignment with the axial hole in the insert, the portion of the hole opening into the base of the recess being tapered inwardly from said base, said tapered portion of the hole having an axis offset from the axis of the remainder of the hole in a direction toward the shoulder of the recess,
a retention pin adjustably secured at one end thereof in the hole in the recess, having an enlarged central portion adapted to form wedging contact with the tapered portion of the hole in the shank, the other end of said pin projecting into the hole in the insert, said projecting end being tapered in a direction opposite to the taper of the hole in the insert, the insert being releasably held in the recess of the shank by tightening of the retention pin.

9. In a cutting tool,
a disposable cutting insert having an axial hole therein,
a seat for the cutting insert having an axial hole therein,
a shank having a recess therein to provide a base and a supporting shoulder for the insert and seat, a hole opening into the base of the recess and adapted for alignment with the axial hole in the insert and seat, the portion of the hole adjacent the base of the recess tapering inwardly from said base and having an axis offset from the axis of the remainder of the hole in a direction toward the shoulder of the recess,
a retention pin adjustably secured at one end thereof in the hole in the recess, having an enlarged central portion tapered to form wedging contact with the tapered portion of the hole in the recess, the other end of said pin projecting into the hole in the insert and seat being releasably held in the recess of the shank by tightening of the retention pin.

10. In a cutting tool,
a disposable cutting insert having a central axial hole therein,
a shank having a recess therein to provide a base and a supporting shoulder for the insert, the shank having a hole therethrough extending from the base of the recess and adapted for alignment with the axial hole in the insert, the hole having a first conical portion adjacent the base of the recess tapering inwardly from said base to a second cylindrical portion of reduced diameter, the axis of the conical portion of the hole being offset from the axis of the cylindrical portion in a direction toward the shoulder of the recess,
a retention pin adjustably secured at one end thereof in the hole in the recess, having an enlarged central conical portion tapered to form wedging contact with the conical portion of the hole in the recess, the other end of said pin projecting into the hole in the insert, said retention pin being symmetrical about the axis thereof, the insert being releasably held in the recess of the shank by slight axial movement of the retention pin into the hole in the shank.

References Cited

UNITED STATES PATENTS

| | | | |
|---|---|---|---|
| 2,598,581 | 5/1952 | McKenna | 29—98 |
| 3,137,059 | 6/1964 | Hertel | 29—96 |
| 3,173,191 | 3/1965 | Alexander | 29—96 |
| 3,226,797 | 1/1966 | Hertel | 29—96 |
| 3,238,600 | 3/1966 | Milewski | 29—96 |

FOREIGN PATENTS 320,809  10/1929  Great Britain.

HARRISON L. HINSON, *Primary Examiner.*